G. E. ROGERS.
PROCESS OF TOUGHENING GLASS.
No. 176,067. Patented April 11, 1876.
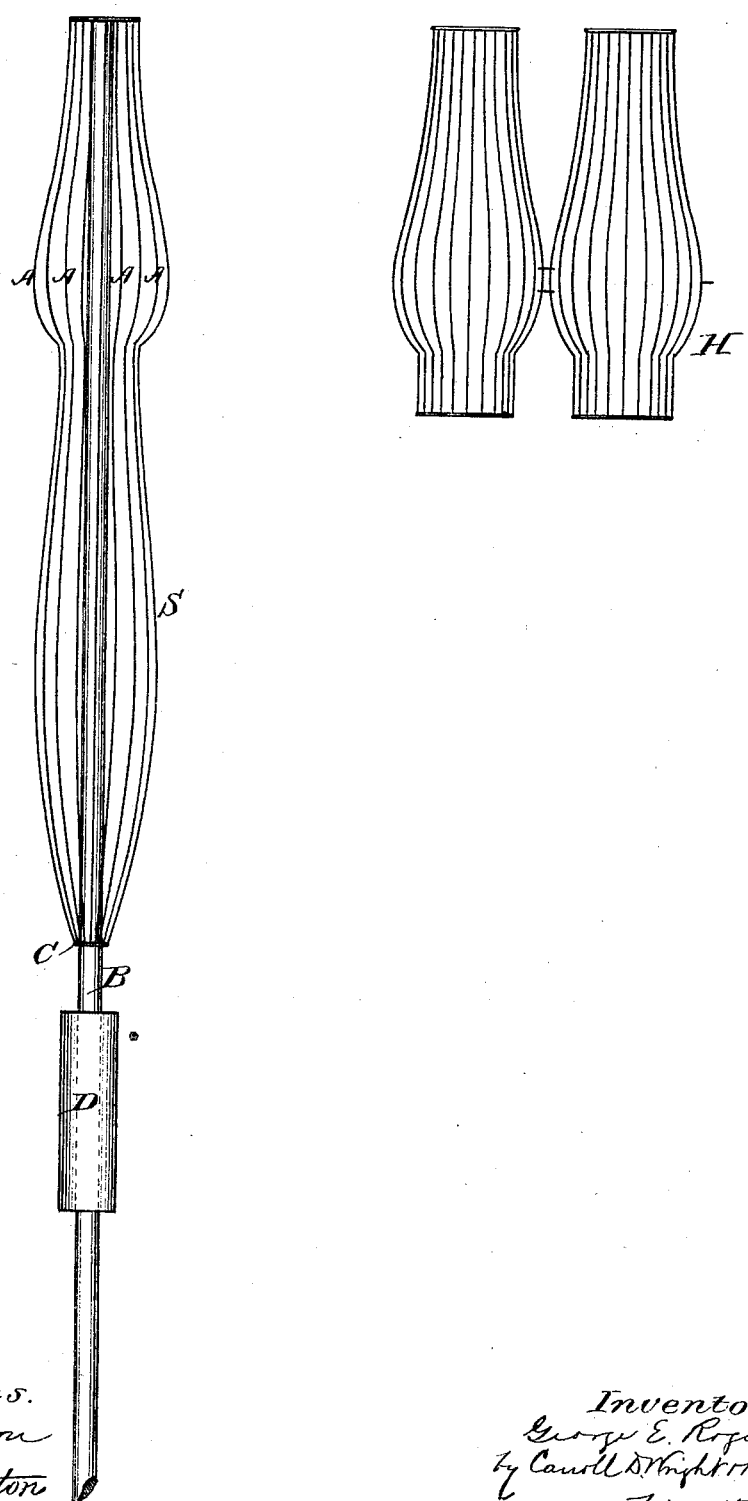
Witnesses.
A. E. Dunison
Saml. M. Barton
Inventor
George E. Rogers
by Cassell D. Wright & Browns
his attys.

UNITED STATES PATENT OFFICE.

GEORGE E. ROGERS, OF CHELSEA, MASSACHUSETTS.

IMPROVEMENT IN PROCESSES FOR TOUGHENING GLASS.

Specification forming part of Letters Patent No. 176,067, dated April 11, 1876; application filed March 2, 1876.

*To all whom it may concern:*

Be it known that I, GEORGE E. ROGERS, of Chelsea, in the county of Suffolk and State of Massachusetts, have invented certain Improvements in Processes for Toughening Glass, of which the following is a specification:

This invention relates to that class of processes employed for producing what are known as "Prince Rupert's drops"—that is to say, soft or molten glass hardened by being plunged into cold water or other cooling medium. Heretofore only shapeless masses of glass have been treated in this manner, for the reason that glass manufactured into useful or valuable shapes for commercial and other purposes could not be heated into a soft putty-like condition without losing shape and value, and it is well known that the Prince Rupert's drop can only be produced from very soft or molten glass.

My invention has for its object to harden a manufactured article of glass by heating the article to softness and then cooling it suddenly, without changing the shape of the article, the process resembling that employed for making the Prince Rupert's drop in heating the material to softness and suddenly cooling it, and differing from said process in that the material is not allowed to lose the useful shape which it possessed before being heated to softness. My invention, therefore, consists in supporting a manufactured article of glass, such, for example, as a lamp-chimney, in and upon an infusible open-work tool or holder, heating it to softness and plunging it while in the soft condition into a cooling medium, the article being supported during the entire process upon the open-work tool or holder, the latter preventing the article from losing its shape when heated to softness, and offering no material obstruction to the action of the heating or cooling mediums.

In carrying out my invention I take any piece of manufactured glass and place it in an open-work tool or holder of any non-combustible material which is infusibly at the melting point of glass, this tool being preferably constructed of thin strips of metal or wire, so formed as to bear evenly on the surface of the glass at suitable intervals. A tool adapted to support and hold a lamp-chimney is shown in the accompanying drawings, this tool being composed of two parts, viz, an expanding supporter, S, adapted to the inner surface of the chimney, and a divided holder or clamp, H, which is adapted to the outer surface of the chimney. The expanding supporter S is composed of a series of narrow strips or wires, A, each fastened at one end to a ring or collar rigidly attached to the end of a rod, B, and at the other to a ring, C, which is adapted to slide on said rod. The wires A are curved to correspond with and support the inner surface of the chimney. D represents a sliding ferrule, which is adapted to slide on and hold the wires A in any desired state of expansion. The divided holder or clamp H is composed of two or more sections hinged together. These sections are also composed of wires which are so curved as to fit the outside of the chimney. It will be seen that this tool is not at all like a mold inclosing the glass, but forms an open, net-like supporter. Its object is not to conduct heat to the glass nor to impart shape to it, but to afford a support for an article previously formed of such nature as to prevent the article supported from losing its shape when heated to softness, and at the same time to allow any heating or cooling medium to reach the glass with as little obstruction as possible. I have found by experiment that a piece of hollow glass, such as a wine-glass or lamp-chimney, when heated to softness immediately falls out of shape, while, if supported in the manner above described, it can be caused to retain its form when heated to softness without receiving any deleterious marks from the supporting-tool. Now, having placed the manufactured glass in a proper open-work frame or holder, I heat the glass to softness, and then while in this condition expose it suddenly to a cooling medium at any comparatively low temperature, such as cold or hot water, or other suitable material. For a modified effect I prefer a cooling medium of a temperature higher than 212° Fahrenheit, and employ superheated steam, compressed air, any pulverized or granular substance not fused, or a fused substance, which may be sulphur or any suitable mineral, alkali or acid, or compounds of the same, or compounds with oxygen or any other element, or gutta percha, or india-rubber. I also obtain the desired effect in some pieces of glass by cooling in any liquid (below 212° Fahrenheit) which will not produce steam in contact with the molten glass.

I find that a current of galvanic or other electricity communicates motion to and has the property of hastening the crystallization in all soft or liquid bodies. I also find that while cold glass is one of the best non-conductors of electricity, hot, soft, or nearly molten glass is one of the best conductors; and I reserve the right to carry out the process described either with or without electricity. The tool employed necessarily varies in form according to the shape of the article to be supported, and for hollow glass having an inside diameter larger than the entrance diameter, I employ a tool substantially like that shown and described, but do not confine myself to this particular device. I am aware of the patents of Le Bastie, Nos. 157,717 and 169,783, and Brookfield, No. 170,339. Neither of these processes, however, involves the heating of the glass to softness, but, on the other hand, they immerse hot hard glass into a bath of melted metal, oil, grease, &c., while I produce from a useful manufactured piece of glass a true "Prince Rupert's drop," (minus the vulnerable point or tail,) making use of a light, very thin, network support, which affords hardly any obstacle to the heating medium, and allows the cooling medium to come into a direct contact with the glass while in a soft condition, which would be impossible by any heretofore-known process. The tool is not in any sense a mold, and I do not communicate heat to, nor detract the heat from, the glass through the material of the tool. The glass lies lightly and loosely enveloped within the tool, and while being heated or cooled the tool is revolved in the hands of the workman rapidly, while the glass, by its inertia, remains still, or nearly so, and the tool at all points plays over the surface of the glass, keeping it fashioned in shape, just as an ordinary chimney-maker's tool plays around the bubble at the end of the blowpipe, giving form to the glass. When the glass is exposed to the shock of the cooling medium (if the latter is a fluid) the tool is again revolved, so that in both cases no heat is conducted through the tool, but directly to or from the surface of the glass.

I claim as my invention—

The process herein described for toughening glass, consisting substantially in supporting a manufactured article of glass on an infusible open-work tool or holder, heating it to softness, and plunging it while in the soft condition into a cooling medium, the article being supported and prevented from losing its shape during the entire process by the open-work tool, substantially as described.

In testimony whereof I have signed my name to this specification in the presence of two subscribing witnesses.

GEORGE EDWIN ROGERS.

Witnesses:
J. MITCHELL,
ED. E. GARDNER.